UNITED STATES PATENT OFFICE.

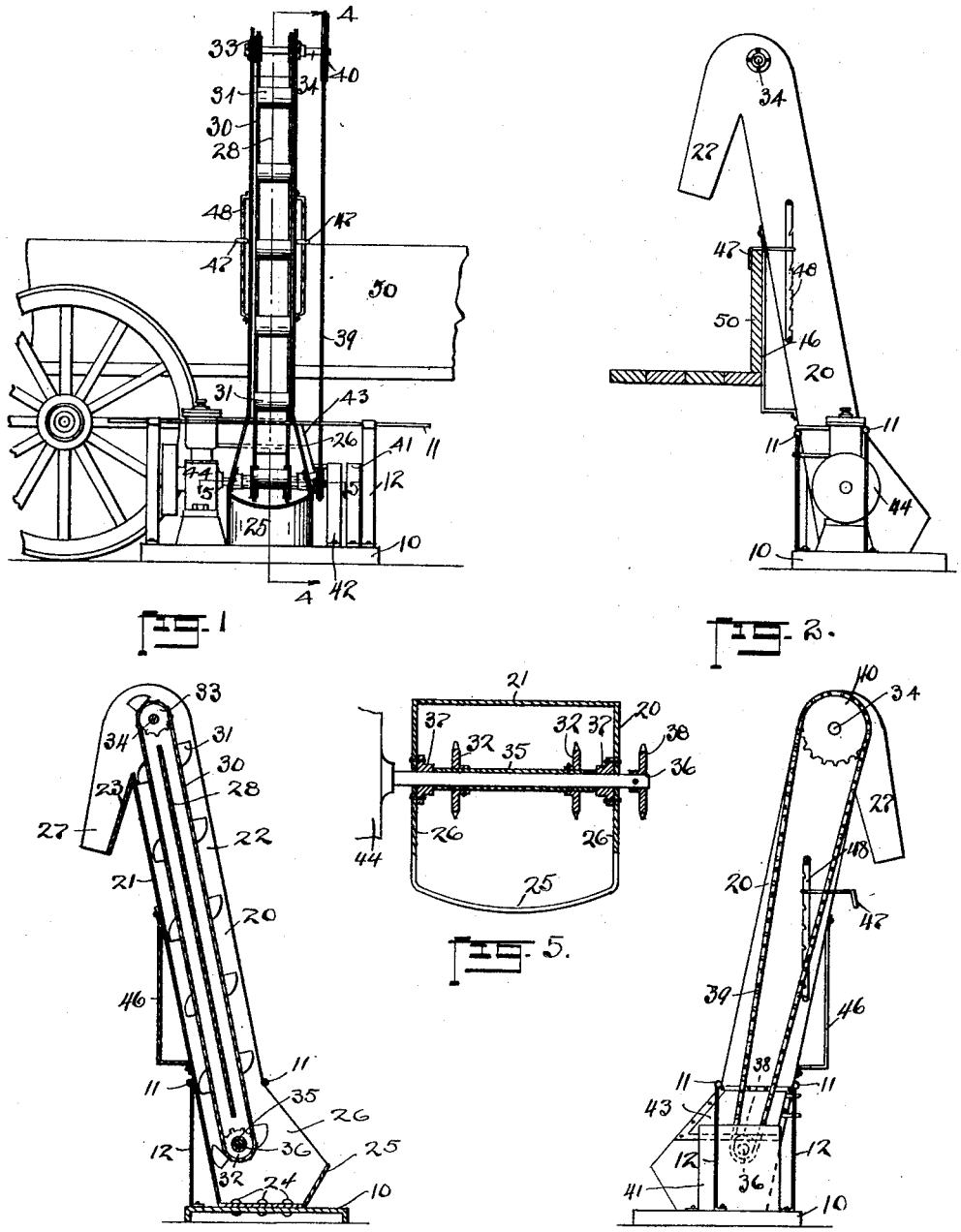

CHARLES R. MAPLES, OF CLEVELAND, OHIO, ASSIGNOR OF ONE-HALF TO HERMAN L. REIS, OF CLEVELAND, OHIO.

EARTH-ELEVATOR.

1,113,669.         Specification of Letters Patent.         Patented Oct. 13, 1914.

Application filed February 26, 1912. Serial No. 679,890.

*To all whom it may concern:*

Be it known that I, CHARLES R. MAPLES, a citizen of the United States, residing at Cleveland, in the county of Cuyahoga and State of Ohio, have invented a certain new and useful Improvement in Earth-Elevators, of which the following is a full, clear, and exact description, reference being had to the accompanying drawings.

The object of this invention is to provide a simple and effective portable power device for elevating earth into wagons, thereby saving time and expense over the present method of raising earth by hand shoveling.

In scooping up earth by a shovel and raising it high enough to pitch it into a wagon body, a large proportion of the time and energy is consumed in the actual raising and pitching the earth after it is on the shovel. I substitute mechanical power for the expensive human power heretofore consumed in this raising operation by providing a portable, mechanically operated elevator adapted to stand on the ground and overhang the side of the wagon body and adapted to receive earth shoveled into it near the ground level. To this end I have devised a mechanism comprising a platform with means whereby it may be carried from place to place, an upwardly extending trough carried by the platform and adapted to overhang and be connected with the side of a wagon body, an endless belt or chain elevator in the trough, and an engine on the platform driving such elevator. With such a mechanism the only human power necessary is to shovel the earth into the lower end of the trough, and the mechanically driven elevator carries it into the wagon.

The invention comprises the mechanism above summarized and also the more particular embodiment thereof shown in the drawings hereof and hereinafter more fully described.

In the drawings, Figure 1 is a front elevation of one embodiment of my invention associated with a wagon into which the elevator discharges; Fig. 2 is a side elevation of my mechanism, a portion of the wagon body being shown in section; Fig. 3 is a side elevation of the elevator from the opposite side from Fig. 2; Fig. 4 is a vertical central section, as indicated by the line 4—4 of Fig. 1; Fig. 5 is an enlarged horizontal section of the driving shaft of the engine, as indicated by the line 5—5 of Fig. 1.

In the drawing, 10 indicates a suitable platform, forming the base of my elevator. At the proper height above this platform are a pair of horizontal bars 11, 11 connected with the platform by vertical braces 12. These bars project at the ends, as shown in Fig. 1, and furnish convenient means by which the mechanism may be lifted from place to place or carried, as desired.

Mounted on the platform 10 is an upwardly extending trough 20. This trough is preferably inclined slightly backward from the vertical. It has a back 21 and sides 22 and is open on the front. Near the upper end the back turns downwardly at an acute angle, as shown at 23, and the sides continue in a similar direction to form a discharge chute 27. The trough is shown as having a bottom 24 resting on and secured to the base 10. In front of this bottom portion is a short front portion 25 which extends diagonally upwardly and is preferably rounded toward the front. The lower portions of the sides 20 flare outwardly, as shown at 26, and these flared portions, with the rounded front 25, make an enlarged receptacle near the ground adapted to receive the earth to be elevated.

Within the trough 20 is the movable, endless elevator. As shown, this elevator comprises two sprocket chains 30 and a series of buckets 31 carried thereby. The two sprocket chains are mounted on two pairs of sprocket wheels 32 and 33 carried near the bottom and top of the trough respectively. The sprocket wheels 33 are shown as rigid on a shaft 34 mounted in the sides 20, while the sprocket wheels 32 are on a tubular shaft 35 which surrounds and is journaled on the main drive shaft 36, which is journaled in bearings 37 secured to the trough sides. At the end of the drive shaft is a sprocket wheel 38 which is connected by a sprocket chain 39 with a sprocket wheel 40 on the shaft 34. Accordingly, when the shaft 36 is rotated, the endless elevator is driven by its upper shaft 34 and material thrown into the lower receptacle is drawn up by the elevator and is discharged down the chute into the wagon body. The speed of the shaft 36 may be geared down by having the wheels 38 and 40 of different size, as shown.

The trough is preferably provided with an intermediate plate 28 between the upwardly and downwardly moving portion of the elevator. This plate forms a chute for material dropping out of the buckets, as well as a backing plate along which the buckets and chain may slide if the chain slackens from wear or load.

To efficiently drive the shaft 36 I provide a suitable engine on the platform, preferably a gasolene explosive engine, designated 44. This engine, it will be noticed, is located on the opposite side of the elevator from the sprocket chain 39. On the latter side are also the gasolene tank 41 and the water tank 42. The latter is connected with the engine jacket by means of piping and a sheet metal radiator 43 located on the side of the trough 20 and made by a flanged plate secured thereto. The weight of the apparatus is accordingly distributed, making it easier to carry by the horizontal bars 11. The whole apparatus may be light enough so that two men can conveniently carry it.

To hold the mechanism, as desired, to the side of the wagon body, I provide on the back plate of the trough a brace plate 46 which extends vertically and is adapted to abut the side of the wagon. This is clearly shown in Fig. 2, the wagon side being designated 50. I also provide hooks 47 adapted to overhang the upper edge of the wagon side, and I mount these hooks slidably on bars 48 secured to the sides of the trough. These bars are preferably notched so that there is no tendency of the hooks to slip along them. It is simply moved up against the side of the wagon and the hooks put in place over the edge of the wagon body. Then, when the engine is rotated, it is only necessary for the workmen to shovel the material into the receptacle. When it is desired to move the device along to a new position, this may be done entirely by human power, or the device may be lifted so that it hangs off the ground on the wagon body by means of the hooks 47, so that the horses may move it to the new position desired.

It will be noticed that the engine, on the one side, and the sprocket chain 39 and tanks on the other, by occupying the space between the horizontal bars 11, are protected by them so that no harm results if the device is accidentally tipped over, or if it is laid on its side or edge in transportation. The compactness of the whole mechanism is a valuable feature of the embodiment shown. There is nothing about the mechanism to get out of order, and it is adapted to receive and elevate various grades of material which may be shoveled into the receptacle.

In some instances it will be desirable to use two elevators end to end with a single wagon. In road building it will be desirable to employ a number of these elevators and a number of wagons, and by arranging the routine so that the elevators may be driven almost constantly, a remarkable saving in the cost of removing the material may be obtained. Furthermore, this is associated with an increased speed of removal, and this factor is of great importance, as it enables the road builder to do his work on days when the weather is most propitious.

Having thus described my invention, what I claim is:

The combination of a platform, an upwardly extending inclined trough resting on the platform and having its lower portion flared to form a hopper and having at its upper portion a downward chute, an endless elevator within the trough, mechanism mounted on the platform for driving said elevator, a brace on the rear side of the trough adapted to abut the side of a wagon body, and an adjustable clamp carried by the trough to clamp the device against the side of the wagon body.

In testimony whereof, I hereunto affix my signature in the presence of two witnesses.

CHAS. R. MAPLES.

Witnesses:
HERMAN L. REIS,
ALBERT H. BATES.